United States Patent
Tada

(10) Patent No.: US 10,863,066 B2
(45) Date of Patent: Dec. 8, 2020

(54) IMAGING DEVICE

(71) Applicant: Takashi Tada, Saitama (JP)

(72) Inventor: Takashi Tada, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/424,513

(22) Filed: May 29, 2019

(65) Prior Publication Data

US 2019/0394367 A1    Dec. 26, 2019

(30) Foreign Application Priority Data

Jun. 26, 2018  (JP) ................................. 2018-120707
Feb. 8, 2019   (JP) ................................. 2019-021126

(51) Int. Cl.
*H04N 5/225* (2006.01)
*H01Q 1/22* (2006.01)

(52) U.S. Cl.
CPC ............. *H04N 5/2253* (2013.01); *H01Q 1/22* (2013.01); *H04N 5/2258* (2013.01)

(58) Field of Classification Search
CPC ............... H04N 5/2253; H04N 5/2258; H04N 5/22521; H04N 5/2252; H01Q 1/22
See application file for complete search history.

(56) References Cited

U.S. PATENT DOCUMENTS

| | | |
|---|---|---|
| 2010/0309363 A1 | 12/2010 | Nakano et al. |
| 2011/0102668 A1 | 5/2011 | Kaga et al. |
| 2011/0109790 A1 | 5/2011 | Shinohara et al. |
| 2011/0177386 A1 | 7/2011 | Tada |
| 2011/0216237 A1 | 9/2011 | Shinohara et al. |
| 2011/0298970 A1 | 12/2011 | Shinohara et al. |
| 2012/0154665 A1 | 6/2012 | Kaga et al. |
| 2013/0242040 A1 | 9/2013 | Masuda et al. |
| 2014/0061009 A1 | 3/2014 | Tada |
| 2014/0071226 A1 | 3/2014 | Satoh et al. |
| 2014/0160274 A1* | 6/2014 | Ishida ................. G01S 19/14  348/113 |
| 2015/0103239 A1* | 4/2015 | Kikuchi ............. H04N 5/23203  348/374 |
| 2015/0341555 A1 | 11/2015 | Artonne et al. |

(Continued)

FOREIGN PATENT DOCUMENTS

| | | |
|---|---|---|
| CN | 101932972 A | 12/2010 |
| EP | 3067855 A1 | 9/2019 |

(Continued)

OTHER PUBLICATIONS

European Search Report dated Sep. 3, 2019, issued in corresponding European Patent Application No. 19175571.9, 9 pages.

(Continued)

*Primary Examiner* — Lin Ye
*Assistant Examiner* — John H Morehead, III
(74) *Attorney, Agent, or Firm* — Xsensus LLP

(57) ABSTRACT

An imaging device includes a casing; a plurality of optical systems held by the casing; and a communication antenna held by the casing. The communication antenna is disposed in an area outside an optical path of light of a maximum angle of view of each of the plurality of optical systems.

17 Claims, 12 Drawing Sheets

(56) References Cited

U.S. PATENT DOCUMENTS

| | | | |
|---|---|---|---|
| 2016/0079671 A1* | 3/2016 | Yamaguchi | H04B 5/0081 343/702 |
| 2017/0237908 A1* | 8/2017 | Ko | H04N 5/247 386/341 |
| 2017/0244163 A1* | 8/2017 | Yoo | H01Q 1/38 |
| 2018/0145405 A1* | 5/2018 | Wu | H01Q 1/242 |
| 2018/0152636 A1* | 5/2018 | Yim | H04N 5/23293 |

FOREIGN PATENT DOCUMENTS

| | | |
|---|---|---|
| JP | 2001-333307 | 11/2001 |
| JP | 2005-303557 | 10/2005 |
| JP | 2007-060237 | 3/2007 |
| JP | 2014-056048 | 3/2014 |
| JP | 2014-115374 | 6/2014 |
| JP | 2017-011659 | 1/2017 |

OTHER PUBLICATIONS

Office Action dated Sep. 28, 2020, in corresponding Chinese Application No. 201910514499.0, 7 pages.

* cited by examiner

IMAGING DEVICE

CROSS-REFERENCE TO RELATED APPLICATION

This patent application is based on and claims priority pursuant to 35 U.S.C. § 119(a) to Japanese Patent Application No. 2018-120707, filed on Jun. 26, 2018 and Japanese Patent Application No. 2019-021126, filed on Feb. 8, 2019 in the Japan Patent Office, the entire disclosures of which are hereby incorporated by reference herein.

BACKGROUND

Technical Field

Embodiments of the present disclosure relate to an imaging device.

Background Art

There are some cases in which metal material is used for the exterior members of electronic devices so as to obtain robustness and high-grade appearance. For example, in digital cameras, the use of exterior members made of magnesium alloy, which is excellent in strength and lightness, is increasing. If an antenna for short distance wireless communication is disposed inside such a metal exterior member, the exterior member might adversely affect the communication performance (a deterioration in the communication performance), and accordingly a desired communication distance cannot be obtained.

In order to avoid such a situation, if a large opening is formed in an exterior member so as not to cover the antenna, the robustness of the exterior member might deteriorate. In view of such circumstances, a communication antenna is disposed on the surface of the first outer layer member, and the external surface of the antenna is covered with the second outer layer member made of nonmetal. This configuration provides the robustness of the first outer layer member and a desired communication performance without providing an opening for antenna communication on the first outer layer member.

Spherical imaging systems are known that include two imaging systems each having the same configuration including a wide-angle lens with a wide angle of view of 180 degrees or more and an image sensor that captures an image formed by the wide-angle lens. Such spherical imaging systems are configured to generate an image within a solid angle of $4\pi$ steradian by combining images captured by two image sensors.

In such spherical imaging systems, it is a key factor where and how to dispose a communication antenna for receiving and transmitting the generated spherical image signals and other various signals. For example, if the communication antenna is disposed inside the maximum angle-of-view optical path of each of the two wide-angle lenses, the communication antenna might be reflected in the spherical image (a portion of the spherical image is absent due to the communication antenna).

SUMMARY

In one aspect of this disclosure, there is provided an imaging device including a casing; a plurality of optical systems held by the casing; and a communication antenna held by the casing. The communication antenna is disposed in an area outside an optical path of light of a maximum angle of view of each of the plurality of optical systems.

In another aspect of this disclosure, there is provided an imaging device including a casing; a plurality of optical systems held by the casing, each of the plurality of optical systems including a lens closest to an object; a communication antenna held by the casing; and a shutter button disposed on a surface of the casing. The lens closest to the object is disposed between the communication antenna and the shutter button.

The embodiments of the present disclosure provide an imaging device that allows the communication antenna to be successfully disposed and provides a good image quality.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
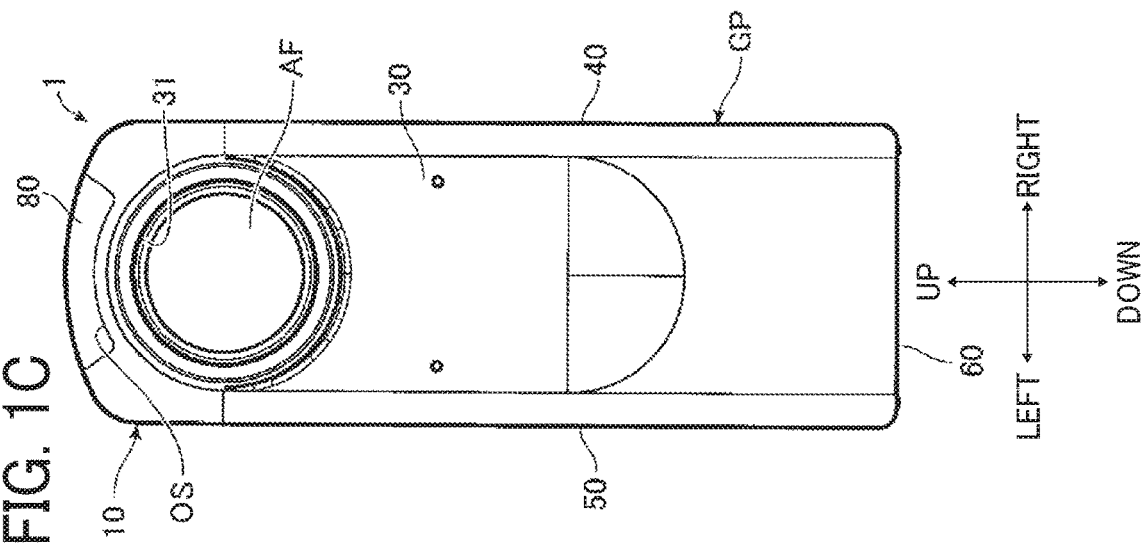
FIGS. 1A, 1B, and 1C (FIG. 1) are illustrations of an external appearance of an imaging device according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to FIGS. 1 to 14, an imaging device 1 according to an embodiment is described in detail. In the figures, a front-to-back direction is parallel to the optical axis of light incident on the lens closest to the object, and an up-to-down direction is along a line between the top and the bottom of a casing 10. A right-to-left direction is vertical orthogonal to the front-to-back direction.

Figure 1B:
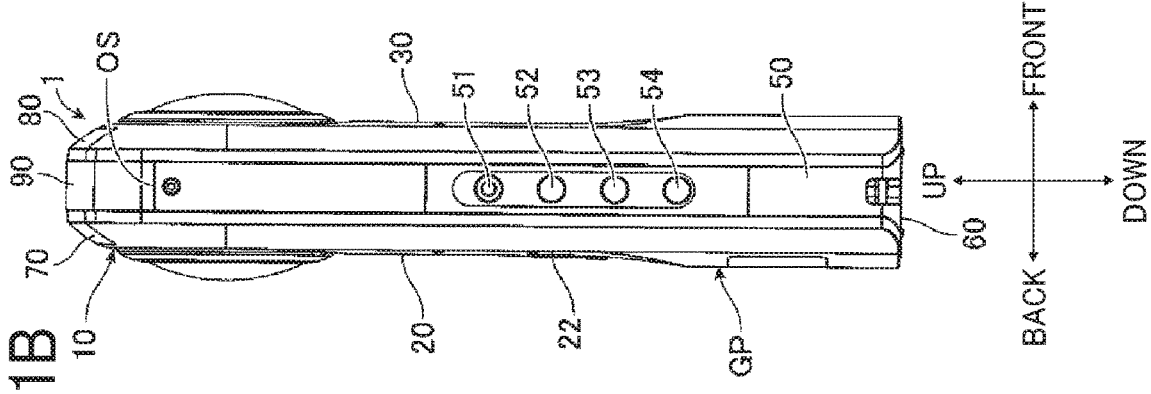
Figure 1C:
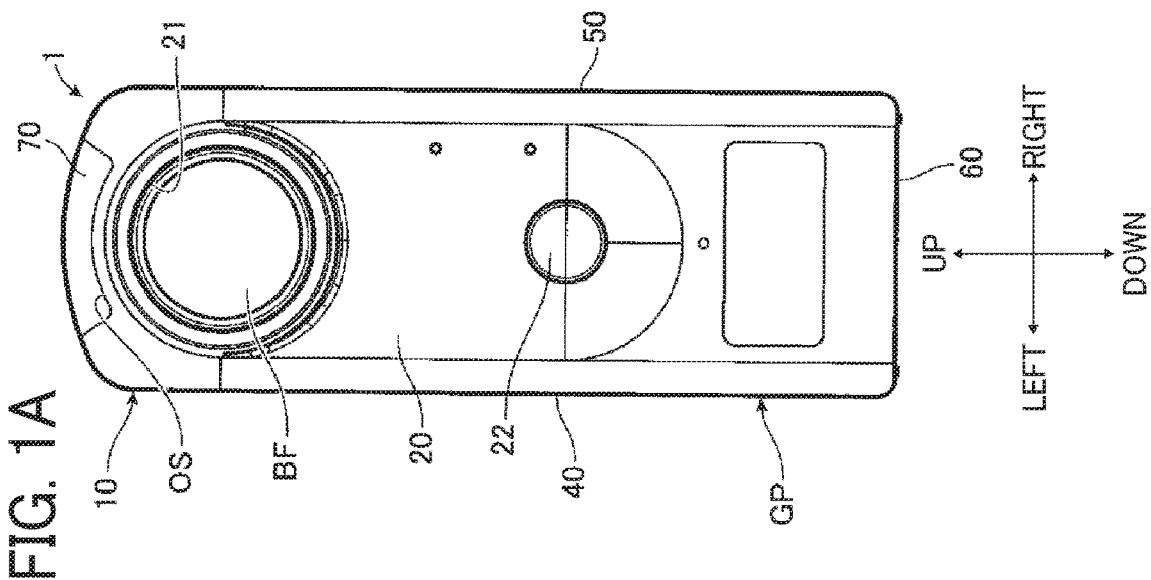

As illustrated in FIGS. 1A, 1B, and 1C, an imaging device 1 includes a casing 10 in which the components of the imaging device 1 are assembled. The casing 10 is short in the right-to-left direction and long in the up-to-down direction. The casing 10 has a round top. The casing 10 has a rear metal casing 20 and a front metal casing 30. The rear metal casing 20 and the front metal casing 30 are made of metal material (for example, magnesium alloy) having higher rigidity (more rigid) than the rigidities of a rear resin casing 70, a front resin casing 80, and a connecting resin casing 90 to be described later. The rear metal casing 20 and the front metal casing 30 are combined as a single molded product.

The rear metal casing 20 and the front metal casing 30 are connected to each other via a left-surface connection casing 40, a right-surface connection casing 50, and a bottom-surface connection casing 60. For example, the left-surface connection casing 40, the right-surface connection casing 50, and the bottom-surface connection casing 60 may be made of the same metal material as those of the rear metal casing 20 and front metal casing 30. However, the material allows for a certain latitude, and various design changes are possible. A positioning boss is formed on one of the rear metal casing 20 and the front metal casing 30, and a boss through-hole is formed in the other one of the rear metal casing 20 and the front metal casing 30. The positioning boss is inserted into the boss through-hole so that the rear metal casing 20 and the front metal casing 30 are positioned together. The rear metal casing 20 and the front metal casing 30 have screw holes on the left surface, the right surface, and the bottom surface, which fasten the rear metal casing 20 and the front metal casing 30 together in a state that the rear metal casing 20 and the front metal casing 30 are positioned together. The left-surface connection casing 40, the right-surface connection casing 50, and the bottom-surface connection casing 60 are fitted into clearances on the left surface, the right surface, and the bottom surface between the rear metal casing 20 and the front mental casing 30, respectively. Joint fastening screws are inserted into the above-described screw holes to combine the rear metal casing 20, the front metal casing 30, the left-surface connection casing 40, the right-surface connection casing 50, and the bottom-surface connection casing 60 together. Note that there is a certain latitude in combining the rear metal casing 20, the front metal casing 30, the left-surface connection casing 40, the right-surface connection casing 50, and the bottom-surface connection casing 60, and various design changes are possible.

The rear metal casing 20 has a substantially circular lens exposure hole 21 at the upper portion, and the front metal casing 30 has a substantially circular lens exposure hole 31 at the upper portion. A shutter button 22 serving as a trigger for imaging (still image imaging, moving image imaging) is provided slightly below the middle portion of the rear metal casing 20 in the vertical direction. That is, the shutter button 22 is disposed on the surface of the rear metal casing 20 of the casing 10. The right-surface connecting casing 50 has a power button 51 for switching on and off of the power supply of the imaging device 1, provided on the intermediate portion of the right-surface connecting casing 50 along the up-to-down direction, and also has operation buttons 52, 53, and 54 for sating the shooting mode or the wireless connection mode, provided below the power button 51.

The combination of the rear metal casing 20, the front metal casing 30, the left-surface connection casing 40, the right-surface connection casing 50, and the bottom-surface connection casing 60 constitute a grip GP below the intermediate portion of the casing 10 along the up-to-down direction. The photographer is able to press the shutter button 22, the power button 51, and the operation buttons 52 to 54 while holding the grip GP.

The combination of the rear metal casing 20, the front metal casing 30, the left-surface connection casing 40, the right-surface connection casing 50, and the bottom-surface connection casing 60 has an opening OS on the top. The opening OS is filled with the rear resin casing 70, the front resin casing 80, and the connection resin casing 90. The detailed structure of the rear resin casing 70, the front resin casing 80, and the connection resin casing 90 (the assembly structure for the rear metal casing 20 and the front metal casing 30) are described in detail later.

Figure 2:
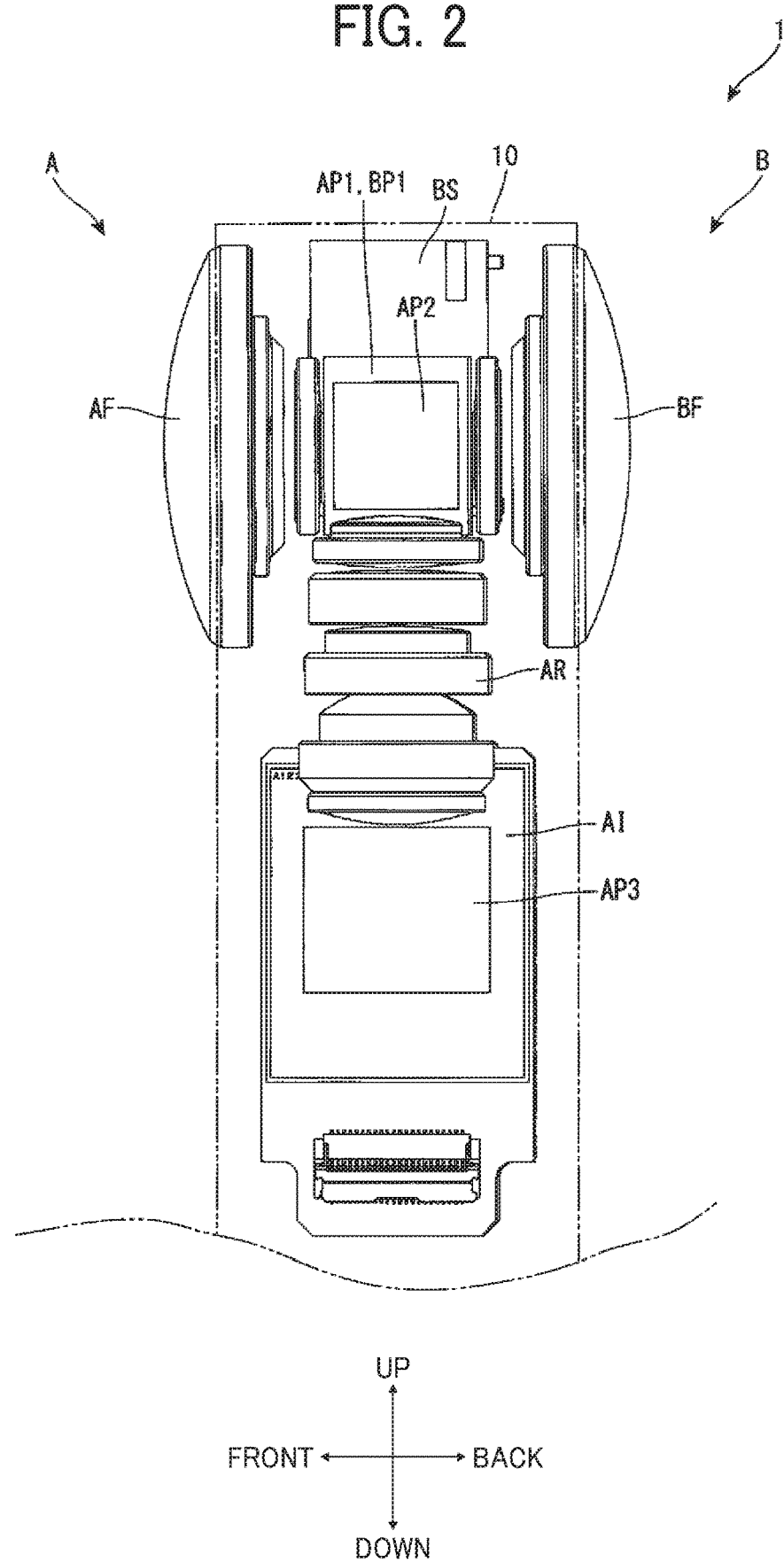
FIG. 2 is a left-side view of a wide-angle lens system and an image sensor held within a casing of the imaging device in FIGS. 1A, 1B, and 1C.
Figure 3:
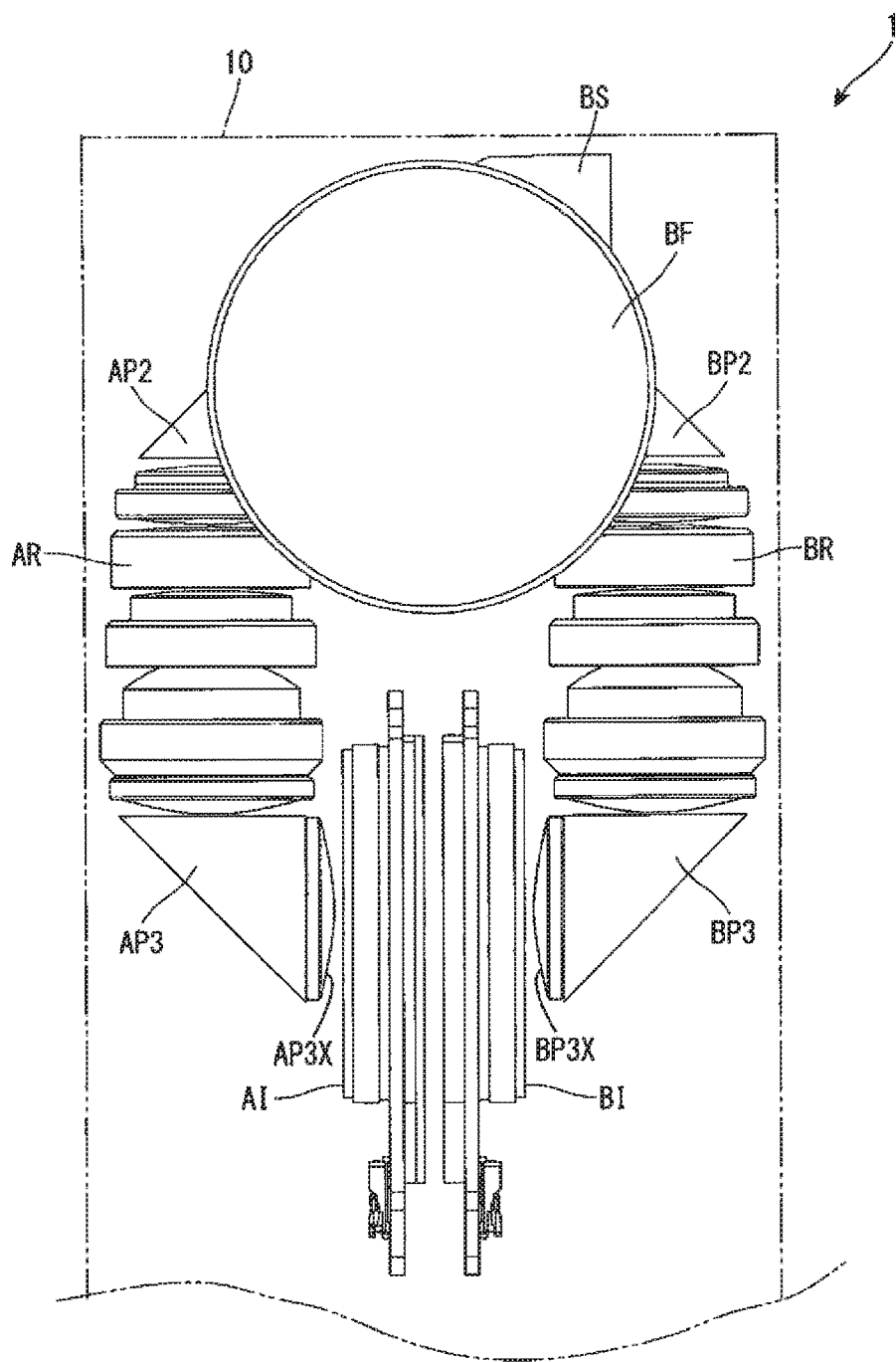
FIG. 3 is a rear view of the wide-angle lens system and the image sensor held within the casing.
Figure 3:
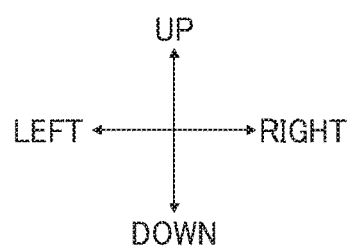
Figure 4:
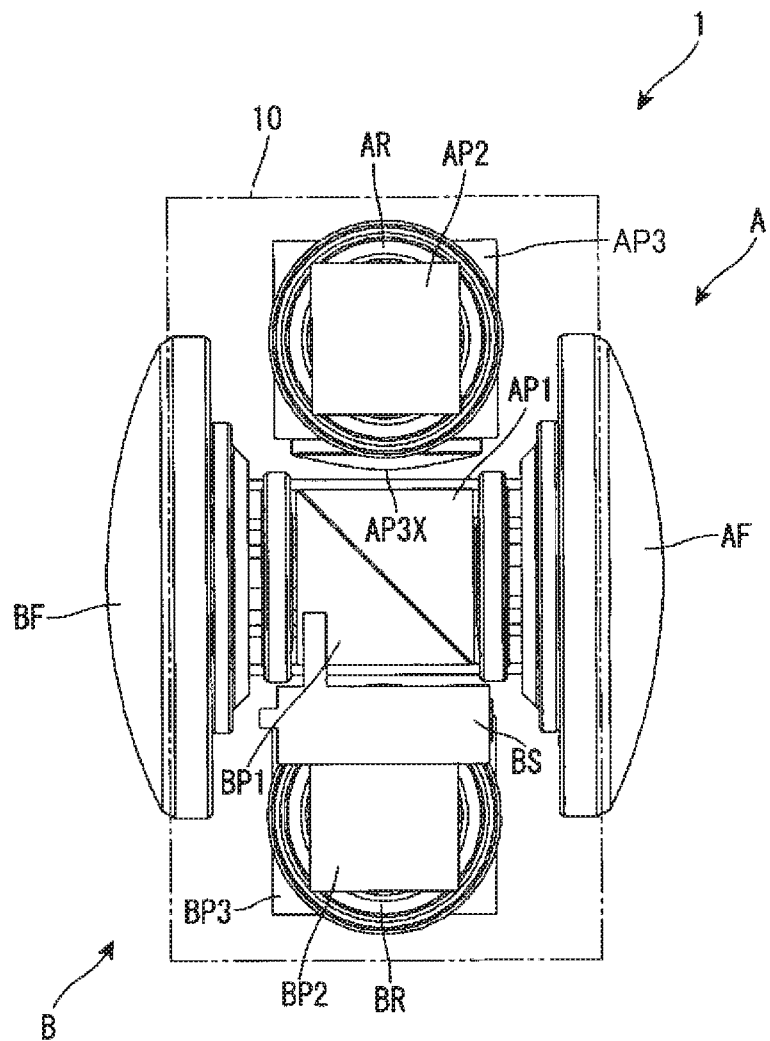
FIG. 4 is a top view of the wide-angle lens system and the image sensor held within the casing.
Figure 4:
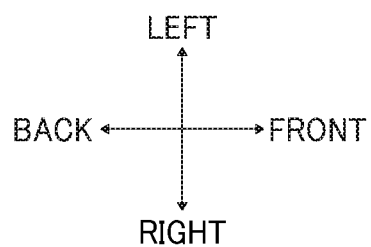

As illustrated in FIGS. 2 to 4, the casing 10 holds (supports, houses) two wide-angle lens systems (fish-eye lens systems, optical systems, and imaging optical systems) A and B arranged symmetrical to each other and two image sensors AI and BI each to form an image captured by the corresponding wide-angle lens A/B. In FIG. 2 to FIG. 4, the casing 10 is schematically drawn with a virtual line (two-dot chain line). The wide-angle lens systems A and B may have the same specification, and the image sensors AI and BI may also have the same specifications. Each of the wide-angle lens systems A and B has an angle of view greater than 180 degrees. The imaging device 1 may be configured as a spherical imaging device that combines two images formed by the image sensors AI and BI to obtain an image with a solid angle of 4π steradian.

The wide-angle lens system A includes a negative front group AF, a first prism (a first reflector) AP1, a variable aperture stop AS, a second prism (a second reflector) AP2, a positive rear group AR, and a third prism (a third reflector) AP3, which are arranged in that order from the object side to the image side. The negative front group AF is capable of capturing light rays with wide angles of view of 180 degrees or more, and the positive rear group AR is capable of correcting aberrations of an image formed by the lens system A. The variable aperture stop AS is illustrated in the exploded view of FIG. 5.

Figure 5:
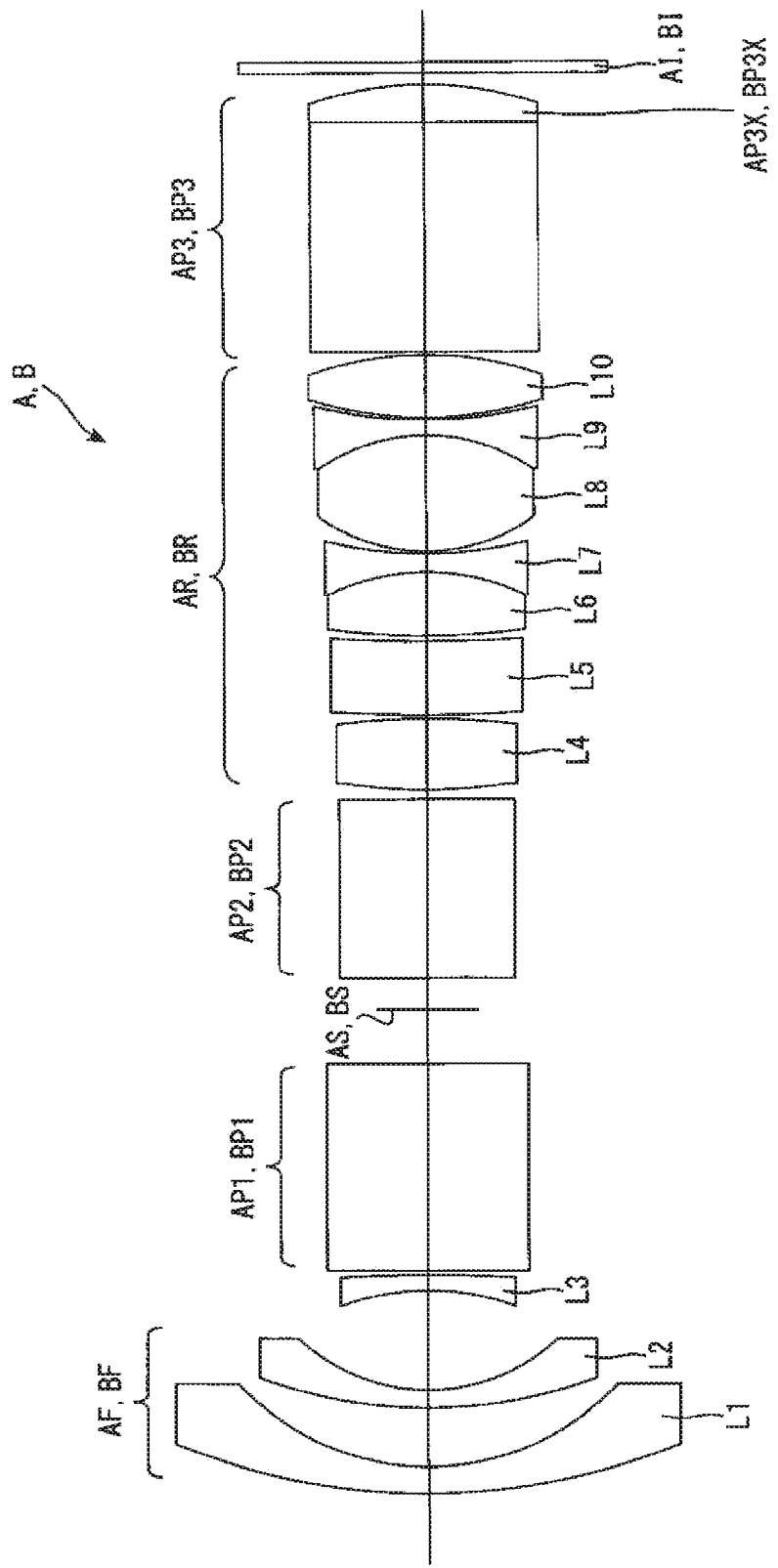
FIG. 5 is an exploded view of the wide-angle lens system and the image sensor held within the casing.
Figure 6C:
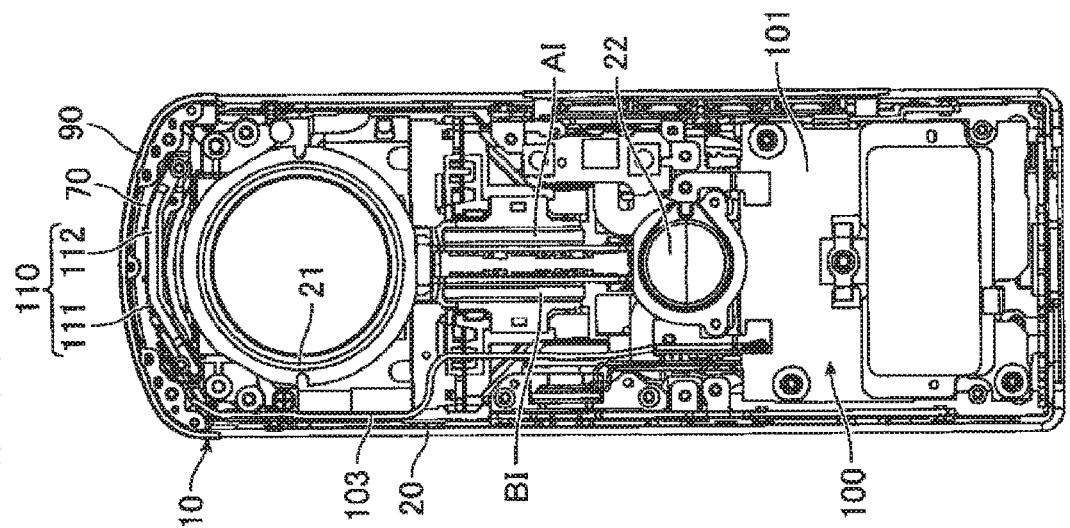
FIGS. 6A, 6B, and 6C (FIG. 6) are illustrations of a sensor substrate and a transmission member held within the casing.
Figure 6B:
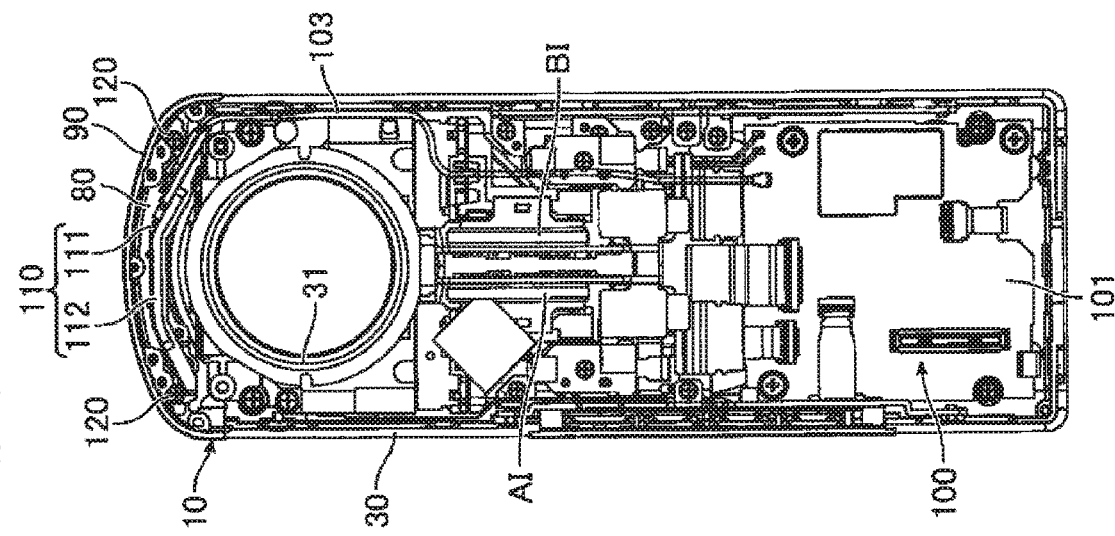
Figure 6A:
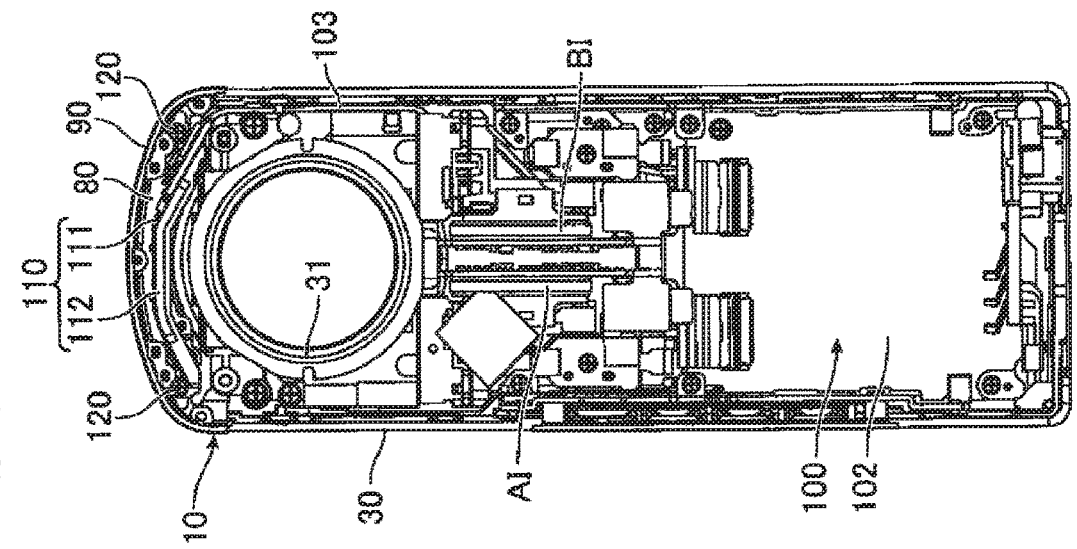

The negative front group AF diverges a light beam of an object that has struck the front group AF from the front side (the front group AF side as illustrated in FIG. 1) while causing the diverging light beam to travel backward (to the front group BF side as illustrated in FIG. 1). The first prism AP1 reflects the light rays traveling from the negative front group AF to the left by 90 degrees. The variable aperture stop AS adjusts the amount (amount of light) of transmission of the light rays reflected by the first prism AP1. The second prism AP2 reflects the light rays, whose amount has been adjusted by the variable aperture stop AS, downward by 90 degrees. The positive rear group AR converges the light rays reflected by the second prism AP2 while causing the converging light rays to travel downward. The third prism AP3 reflects the light beam of the object that has passed through the positive rear group AR and struck the third prism AP3, to the right by 90 degrees, and the reflected light beam forms an image on an imaging plane of the image sensor AI. The third prism AP3 has a convex surface AP3X (an exit surface) that projects toward the imaging plane of the image sensor AI. Each of the negative front group AF and the positive rear group AR (AF and AR in FIGS. 2 to 4) includes a plurality of lenses as illustrated in FIG. 5.

The wide-angle lens system B includes a negative front group BF, a first prism (a first reflector) BP1, a variable aperture stop BS, a second prism (a second reflector) BP2, a positive rear group BR, and a third prism (a third reflector) BP3, which are arranged in that order from the object side to the image side. The negative front group BF is capable of capturing of a wide angle1 of view of 180 degrees or more, and the positive rear group BR is capable of correcting aberrations of an image formed by the lens system B.

The negative front group BF diverges a light beam of an object that has struck the front group BF from the back side (the front group BF side as illustrated in FIG. 1) while causing the diverging light beam to travel forward. The first prism BP1 reflects the light rays traveling from the negative front group BF to the right by 90 degrees. The variable aperture stop BS adjusts the amount (amount of light) of transmission of the light rays reflected by the first prism BP1. The second prism BP2 reflects the light rays, whose amount has been adjusted by the variable aperture stop BS, downward by 90 degrees. The positive rear group BR converges the light rays reflected by the second prism BP2 while causing the converging light rays to travel downward. The third prism BP3 reflects the light beam that has passed through the positive rear group BR and struck the third prism BP3, to the right by 90 degrees, and the reflected light beam forms an image on an imaging plane of the image sensor BI. The third prism BP3 has a convex surface BP3X (an exit surface) that projects toward the imaging plane of the image sensor BI. Each of the negative front group BF and the positive rear group BR (BF and BR in FIGS. 2 to 4) includes a plurality of lenses as illustrated in FIG. 5.

In the wide-angle lens system A, the imaging plane of the image sensor AI faces the left. In the wide-angle lens system B, the imaging plane of the image sensor BI faces the right. The back faces (the opposite plane of each imaging plane) of image sensors AI and BI face in opposite directions.

FIG. 5 is an exploded diagram of each of the wide-angle lens systems A and B and the image sensors AI and BI. In FIG. 5, the reflection directions by the first prism AP1 to the third prism AP3 and the first prism BP1 to the third prism BP3 are not concerned. That is, the configurations of the wide-angle lens system A and the image sensor AI are the same as those of the wide-angle lens system B and the image sensor BI.

Each of the negative front lens groups AF and BF includes a negative meniscus lens L1 with a convex surface facing the object side, a negative meniscus lens L2 with a convex surface facing the object side, and a negative biconcave lens L3, arranged in that order from the object side to the image side.

Each of the positive rear groups AR and BR includes a positive biconvex lens L4, a positive meniscus lens L5 with a convex surface facing the object side, a positive biconvex lens L6, a negative biconcave lens L7, a positive biconvex lens L8, a negative biconcave lens L9, and a positive biconvex lens L10, arranged in that order from the object side to the image side. The positive biconvex lens L6 and the negative biconcave lens L7 are bonded together. The positive biconvex lens L8 and the negative biconcave lens L9 are bonded together.

The above-described configurations of the negative front groups AF, BF and the positive rear groups AR, BR are merely examples, and the negative front groups AF and BF and the positive rear groups AR and BR may be variable in design. In addition, the front groups AF and BF may have positive power instead of negative power, and the rear groups AR and BR may have negative power instead of positive power.

In the imaging device 1 configured as described above, the negative front group AF of the wide-angle lens system A and the negative front group BF of the wide-angle lens system B are arranged facing in opposite directions along the front-to-back direction, i.e., the optical axis common between the wide-angle lens system A and the wide-angle lens system B. The wide-angle lens system A/B is bent by 90 degrees using the first prism AP1/BP1 and the second prism AP2/BP2 so that the positive rear group AR and the positive rear group BR extend in parallel along the up-to-down direction of the casing 10. In this case, the positive rear group AR and the positive rear group BR are separated from each other along right-to-left direction. The positive rear group AR and the positive rear group BR may extend in parallel to each other along the up-to-down direction, or may extend slightly out of parallel (substantially parallel). The image sensor AI is disposed next to the third prism AP3 bending the optical axis of the wide-angle lens system A to the right by 90 degrees. The image sensor BI is disposed next to the third prism BP3 bending the optical axis of the wide-angle lens system B to the left by 90 degrees. Thus, the imaging plane of the image sensor AI and imaging plane of the image sensor BI are opposed to each other along the right-to-left direction. In other words, the planes opposite to the imaging planes of the image sensors AI and BI face in the directions opposite to each other. In the imaging device 1, the object-side lens of the negative front group AF of the wide-angle lens system A protrudes forward from the lens exposure hole 31 of the front metal casing 30, and the object-side lens of the negative front group BF of the wide-angle lens system B protrudes backward from the lens exposure hole 21 of the rear metal casing 20. Further, the other components are housed inside the casing 10.

That is, the wide-angle lens systems A and B include the front groups AF and BF, respectively, which are opposed to each other along the front-to-back direction, at the upper portion of the casing 10. Further, the wide-angle lens systems A and B include the rear groups AR and BR, respectively that extend along the up-to-down direction of the casing 10. As described above, the wide-angle lens systems A and B include the first prisms AP1 and BP1 (first reflectors), the second prisms AP2 and BP2 (second reflectors), and the third prisms AP3 and BP3 (third reflectors), respectively. In the upper portion of the casing 10, each of the first prisms AP1 and BP1 changes the direction of travel of (reflects) the light beam (of an object) that has passed through the (corresponding) front group AF/BF, to the right or left of the right-to-left direction. In the upper portion of the casing 10, each of the second prisms AP2 and BP2 changes the direction of travel of (reflects) the light beam that has passed through the (corresponding) first prisms AP1/BP1 (the first reflector) upward or downward along the up-to-down direction. Further, in the lower portion of the casing 10, each of the third prisms AP3 and BP3 (the third reflector) changes the direction of travel of (reflects) the light beam that has passed through the (corresponding) rear group AR/BR to the right or left along the right-to-left direction. With this configuration, the components of the imaging device 1 can be disposed within the casing 10 more compactly.

The first prism AP1 of the wide-angle lens system A and the first prism BP1 of the wide-angle lens system B have a reflecting surface (reflector) common between the wide-angle lens systems A and B. In other words, the slanted surface of the first prism AP1 and the slanted surface of the first prism BP1 are in contact with each other to share the common reflecting surface. The reflecting surface of each of the wide-angle lens systems A and B is made of a reflecting film common to the wide-angle lens systems A and B. This reflecting film is disposed between the slanted surface of the first prism AP1 and the slanted surface of the first prism BP1, which are transparent members optically equivalent to each other. Thus, the reflecting surface (reflector) common between the wide-angle lens systems A and B is formed by combining the first prism AP1, the first prism BP1, and the reflecting film in such a manner. This configuration can reduce the width of the imaging device 1 along the direction of the optical axis common between the front group AF of the wide-angle lens system A and the front group BF of the wide-angle lens system B.

The variable aperture stop AS is disposed between the first prism AP1 and the second prism AP2 of the wide-angle lens system A. The variable aperture stop BS is disposed between the first prism BP1 and the second prism BP2 of the wide-angle lens system B. The first prism AP1 and the second prism AP2 are disposed near (in front and back of) the variable aperture stop AS that adjusts the amount of light. Further, the first prism BP1 and the second prism BP2 are disposed near (in front and back of) the variable aperture stop BS that adjusts the amount of light. With such an arrangement, small right-angle prisms can be used so that the distance between the wide-angle lens system A and the wide-angle lens system B can be reduced. Further, such an arrangement provides a symmetrical configuration in which the first prism AP1 and the second prism AP2 are disposed on the front and back sides of the variable aperture stop AS, respectively, the negative front group AF is disposed on the front side of the first prism AP1, and the positive rear group AR is disposed on the back side of the second prism AP2. Further, the same symmetrical configuration is also provided in the wide-angle lens system B in which the first prism BP1 and the second prism BP2 are disposed on the front and back sides of the variable aperture stop BS, respectively, the negative front group BF is disposed on the front side of the first prism BP1, and the positive rear group BR is disposed on the back side of the second prism BP2.

The variable aperture stop AS and the variable aperture stop BS are adjusted independently of each other based on the outputs of the image sensor AI and the image sensor BI. For example, when the imaging device 1 is used outside, sunlight might enter only one of the wide-angle lens systems A and B. In such a case, the brightness (degree of exposure) might significantly differ between the wide-angle lens systems A and B. In such a state, an unnatural-looking spherical image in which the boundary between bright portions and dark portions are reflected is obtained by combining the images formed by the image sensor AI and the image BI whose brightness (degree of exposure) differs between each other. In view of such a situation, when sunlight enters only one of the wide-angle lens systems A and B, the variable aperture stop of the wide-angle lens system (A/B) into which sunlight has entered is narrowed more than the variable aperture stop of the other wide-angle lens system does, so as to uniform the brightness (the degree of exposure) of the wide-angle lens systems A and B. Thus, a natural-looking spherical image in which there is no boundary between bright portions and dark portions can be obtained.

The third prism AP3 of the wide-angle lens system A has a convex surface (aspherical surface) AP3X projecting toward the image sensor AI. The third prism BP3 of the wide-angle lens system B has a convex surface (aspherical surface) BP3X protruding toward the image sensor BI. Since the wide-angle lens systems A and B have short focal lengths, the back focal length might become long despite the short focal length when the last surface closest to the image within each of the wide-angle lens systems A and B is curved. In order to avoid such a situation, the convex surface AP3X and the convex surface BP3X are provided on the third prism AP3 and the third prism BP3, respectively to change the positions from which light rays emit.

The wide-angle lens systems A and B and the image sensors AI and BI configured as described above are combined as an optical unit. Screw holes are formed in the optical unit. The optical unit (the wide-angle lens systems A and B and the image sensors AI and BI) is assembled by inserting and screwing joint screws into the screw holes, housed in the combination of the rear metal casing 20, the front metal casing 30, the left-surface connection casing 40, the right-surface connection casing 50, and the bottom-surface connection casing 60 as a single unit.

As illustrated in FIGS. 6A to 6C, 7A and 7B, a wireless module board 100 that converts imaging signals from the image sensors AI and BI into wireless signals is held (supported, housed) in the lower portion of the casing 10. The wireless module board 100 includes a sub-board 101 on the front side and a main board 102 on the back side, which overlap along the front-to-back direction and electrically coupled to each other. The sub-board 101 forms a relatively small and substantially rectangular shape in plan view, whereas the main board 102 forms a relatively large and substantially rectangular shape in plan view. The main board 102 includes a transmission member 103 in the upper right portion. The transmission member 103 is extended upward, bent rightward, further extended upward, and then bent leftward. The transmission member may be composed of, for example, a coaxial cable or a flexible printed circuit (FPC).

One end of the transmission member 103 is connected to the main board 102, and the other end is connected to the communication antenna 110. The transmission member 103 transmits the imaging signals of the image sensors AI and BI to the communication antenna 110, and the communication antenna 110 wirelessly transmits the imaging signals to the external device. Further, the communication antenna 110 is capable of transmitting and receiving various signals to and from the external device.

The communication antenna 110 includes an antenna body 111 and an antenna board 112 for holding the antenna body 111. The antenna body 111 may be configured by, for example, an FPC or a rigid FPC. The antenna board 112 has a bent shape (circular shape) of the opening OS formed on the upper surface of the combination of the rear metal casing 20, the front metal casing 30, the left-surface connection casing 40, the right-surface connection casing 50, and the bottom-surface connection casing 60. The other end of the transmission member 103 is connected to the bent-shaped upper surface, and the antenna body 111 is attached to the bent-shaped upper surface.

Figure 8A:
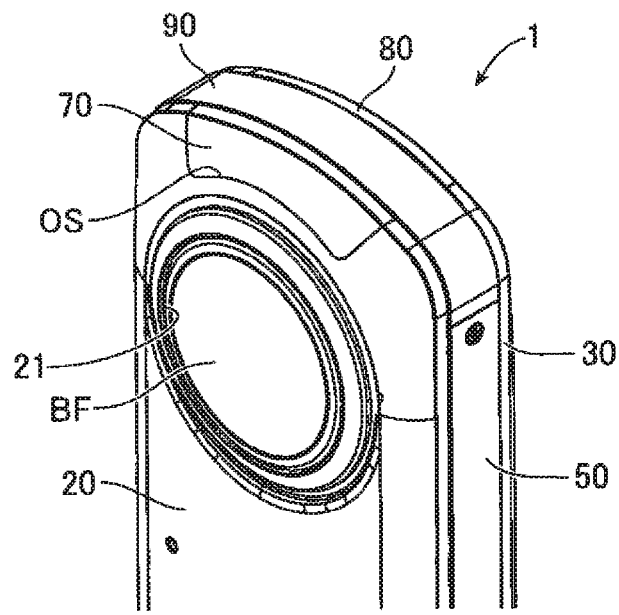
FIGS. 8A and 8B (FIG. 8) are perspective views of a configuration that covers an opening on the top of a metal casing with a resin casing.
Figure 8B:
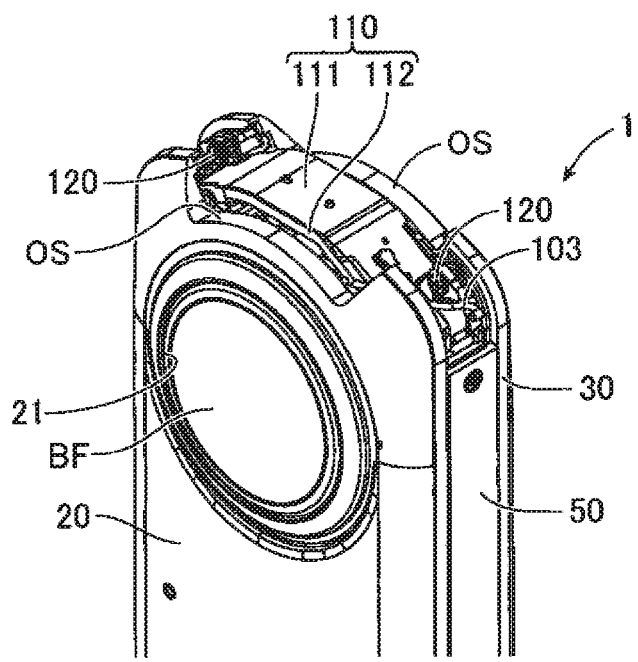

As illustrated in FIGS. 8A and 8B, the opening OS in which the communication antenna 110 is accommodated (held) is filled with the rear resin casing 70, the front resin casing 80, and the connection resin casing 90. The rear resin casing 70, the front resin casing 80, and the connection resin casing 90 are combined as a single molded product made of relatively less rigid resin materials, such as polycarbonate (PC), acrylonitrile butadiene styrene (ABS) resin, and mixed material of the PC and ABS resin, than the rear metal casing 20 and the front metal casing 30 do.

The rear resin case 70 has a curved shape that is fitted into a curved notch of the opening OS formed on the top of the rear metal case 20. The front resin case 80 has a curved shape that is fitted into a curved notch of the opening OS formed on the top of the front metal case 30. The rear resin casing 70 and the front resin casing 80 have a symmetrical shape facing in the opposite direction along the front-to-back direction. The connection resin casing 90 has a curved shape that is fitted between the rear resin casing 70 and the front resin casing 80 in the opening OS formed on the top of the rear metal casing 20 and the front metal casing 30.

Figure 9A:
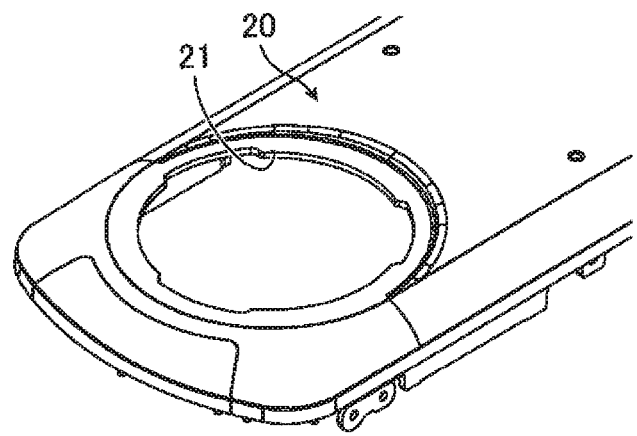
FIGS. 9A and 9B (FIG. 9) are perspective views of a configuration that connects a rear metal casing and a rear resin casing.
Figure 9B:
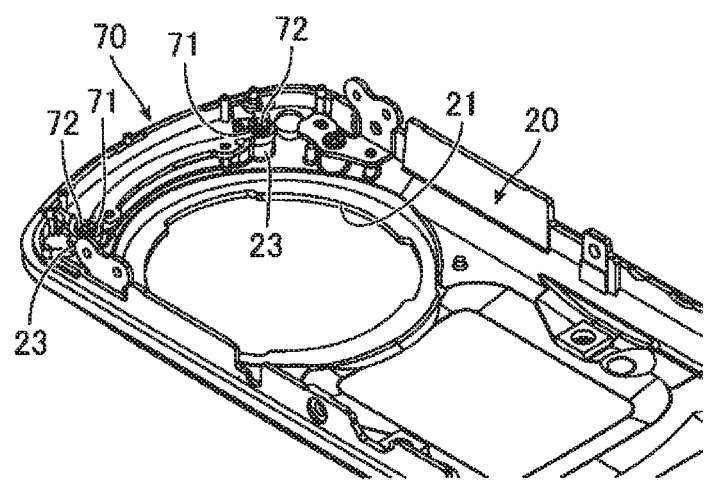

As illustrated in FIGS. 9A and 9B, the rear metal casing 20 has a pair of projections 23 provided with screw holes apart from each other along right-to-left direction, slightly above the lens exposure hole 21. The rear resin casing 70 has a pair of screw through-holes 71 corresponding to the pair of projections 23 with screw holes. The pair of screw through-holes 71 and the pair of projections 23 with screw holes are aligned with each other, and a pair of fastening screws 72 are inserted into the pair of screw through-holes 71 to be screwed (fastened) into the screw holes of the projections 23. Thus, the rear metal casing 20 is coupled (connected) to the rear resin casing 70. The same connection structure applies to the front metal casing 30 and the front resin casing 80.

With reference to FIGS. 10 to 13, the process of attaching the communication antenna 110 and the connection resin case 90 to the combination of the front metal case 30 and the front resin case 80 is described below.

Figure 10:
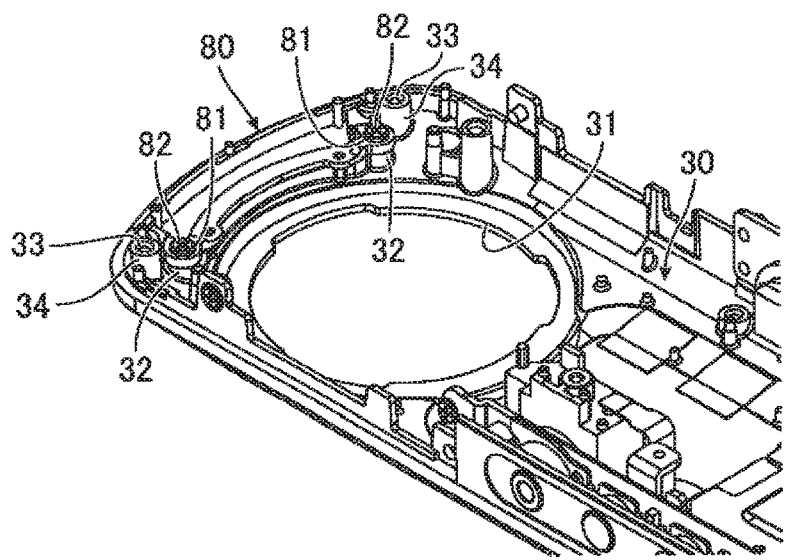
FIG. 10 is an illustration of a first process to attach a communication antenna and a connection resin casing to a combination of a front metal casing and a front resin casing as a single unit.

As illustrated in FIG. 10, the front metal casing 30 has a pair of projections 32 provided with screw holes apart from each other along right-to-left direction, slightly above the lens exposure hole 31. The front resin casing 80 has a pair of screw through-holes 81 corresponding to the pair of projections 32 with screw holes. The pair of screw through-holes 81 and the pair of projections 32 with screw holes are aligned with each other, and a pair of fastening screws 82 are inserted into the pair of screw through-holes 81, and screwed (fastened) into the screw holes of the projections 32. Thus, the front metal casing 30 is coupled (connected) to the front resin casing 80. A plurality of bosses is formed at the upper portions of the front metal casing 30 and the front resin casing 80. The plurality of bosses is inserted into a plurality of boss through-holes of the connection resin case 90 so as to enables positioning of the connection resin case 90. There is a latitude in the number and shape of the plurality of bosses, and various design changes are possible. On the front metal casing 30, a projection 34 provided with a screw hole 33 is disposed on both sides of the front resin casing 80.

Figure 11:
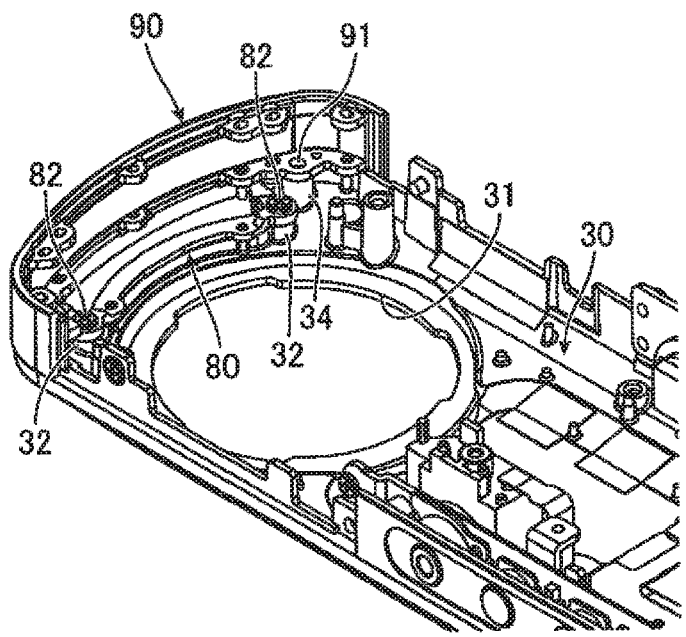
FIG. 11 is an illustration of a second process to attach the communication antenna and the connection resin casing to the combination of the front metal casing and the front resin casing.

As illustrated in FIG. 11, the plurality of bosses (formed at the upper portions of the front metal casing 30 and the front resin casing 80) are inserted into the plurality of boss through-holes of the connection resin case 90, so as to achieve positioning of the connection resin casing 90. The connection resin casing 90 has a pair of screw through-holes 91 separated in the left-to-right direction (in FIG. 11, only one of the pair of screw through-holes 91 is illustrated). When the connection resin casing 90 is positioned, the pair of screw through-holes 91 and the pair of screw holes 33 of the front metal casing 30 are overlaid on each other and match with each other.

Figure 7A:
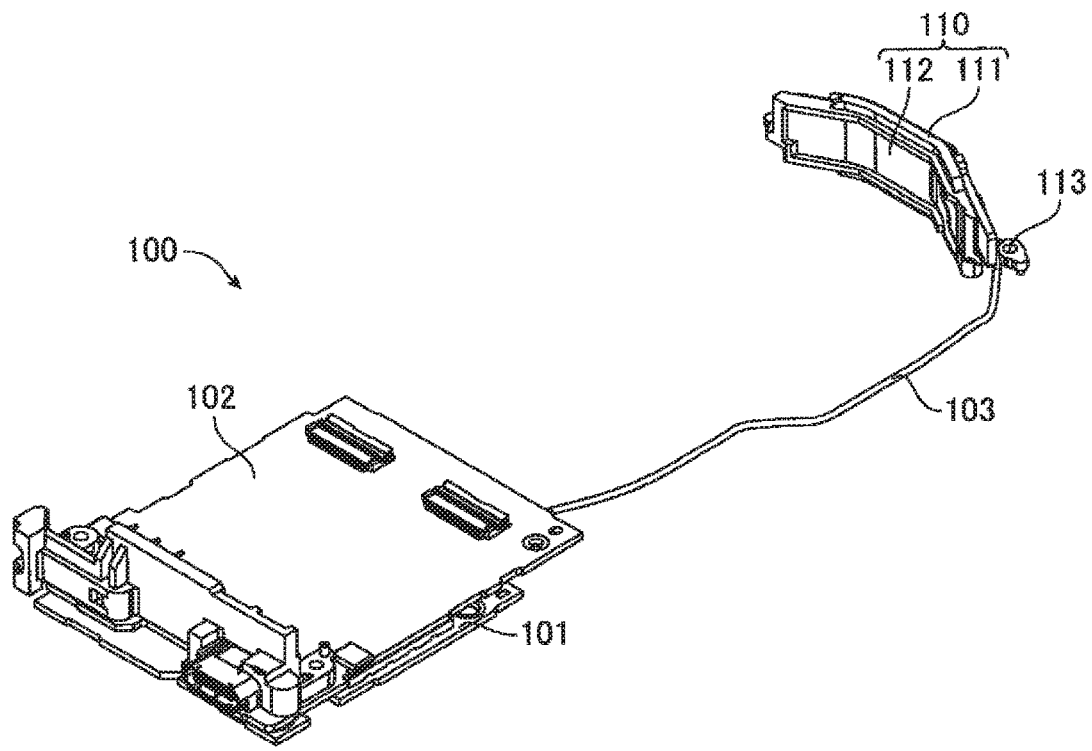
FIGS. 7A and 7B (FIG. 7) are perspective views of an overall configuration of a wireless module substrate.
Figure 7B:
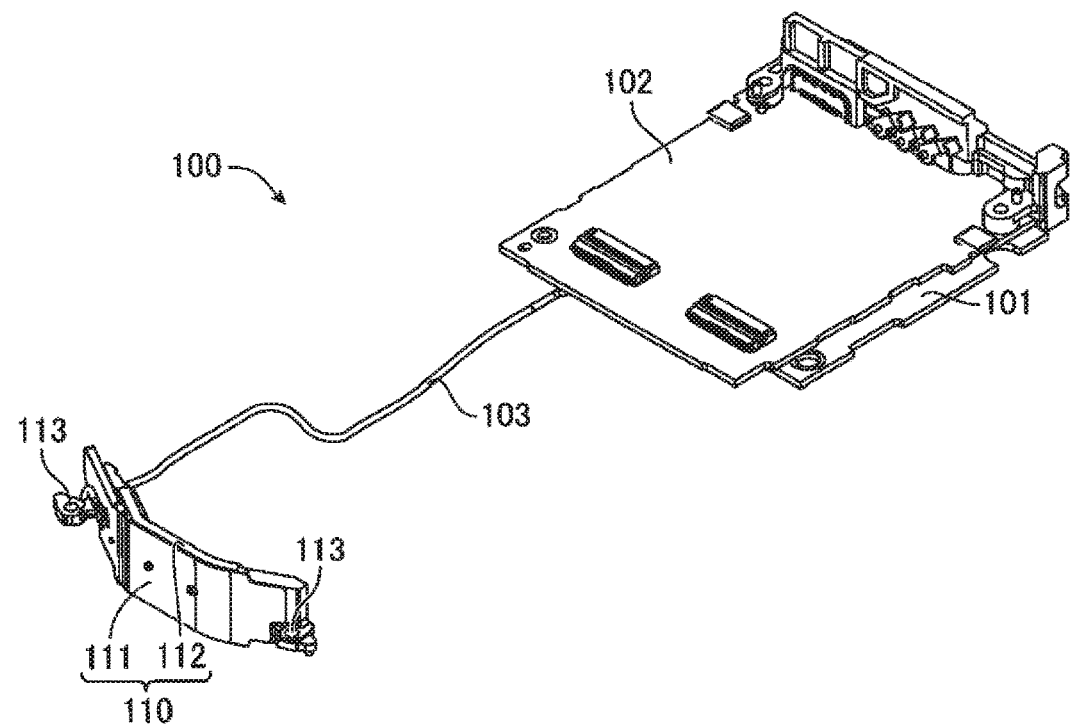
Figure 12:
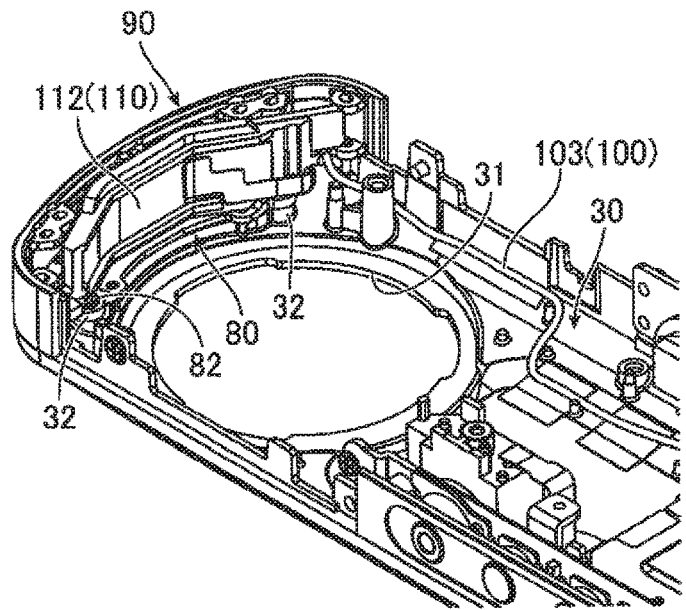
FIG. 12 is an illustration of a third process to attach the communication antenna and the connection resin casing to the combination of the front metal casing and the front resin casing.

As illustrated in FIG. 12, the communication antenna 110 connected to the transmission member 103 (a transmitter) of the wireless module board 100 is attached to the upper portion of the casing 10 (the front metal casing 30, the front resin casing 80, and the connection resin casing 90). As illustrated in FIGS. 7A and 7B, the antenna board 112 of the communication antenna 110 has a pair of screw through-holes 113 separated in the left-to-right direction. When the communication antenna 110 is attached to the casing 10, the pair of screw through-holes 91 of the connection resin casing 90 and the pair of screw through-holes 113 of the antenna board 112 of the communication antenna 110 are overlaid on the pair of screw holes 33 of the front metal casing 30.

Figure 13:
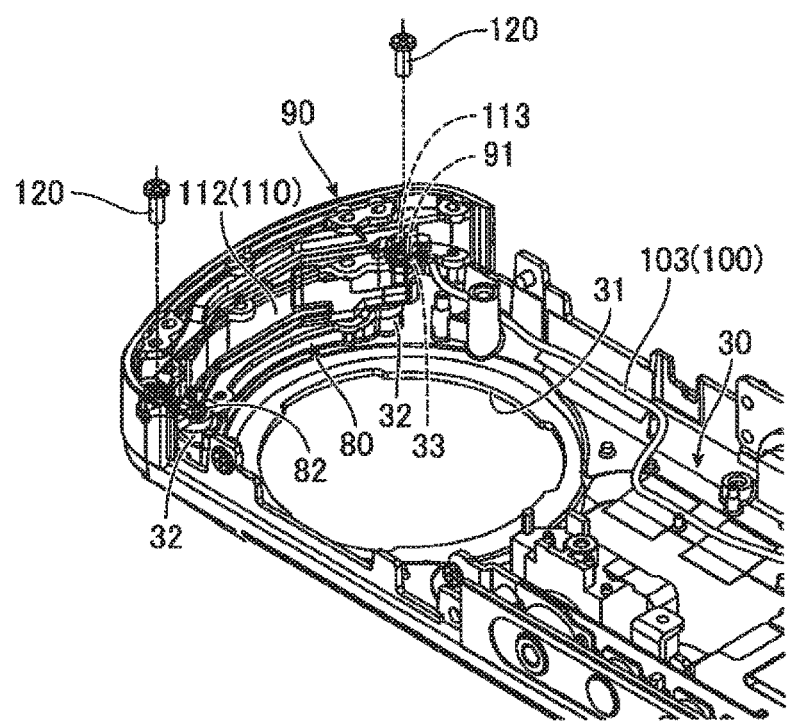
FIG. 13 is an illustration of a fourth process to attach the communication antenna and the connection resin casing to the combination of the front metal casing and the front resin casing.

As illustrated in FIG. 13, a pair of fastening screws 120 is inserted to the pair of screw through-holes 91 of the connection resin casing 90 and the pair of screw through-holes 113 of the antenna board 112 of the communication antenna 110. The pair of fastening screws 120 is screwed (tightened) into the pair of screw holes 33 of the front metal casing 30. Thus, the front metal casing 30 (the front resin casing 80), the connection resin casing 90, and the communication antenna 110 are combined as a single unit (see also FIGS. 6A, 6B, and 8B). The combination of the rear metal casing 20 and the rear resin casing 70 is attached to the combined single unit.

Figure 14:
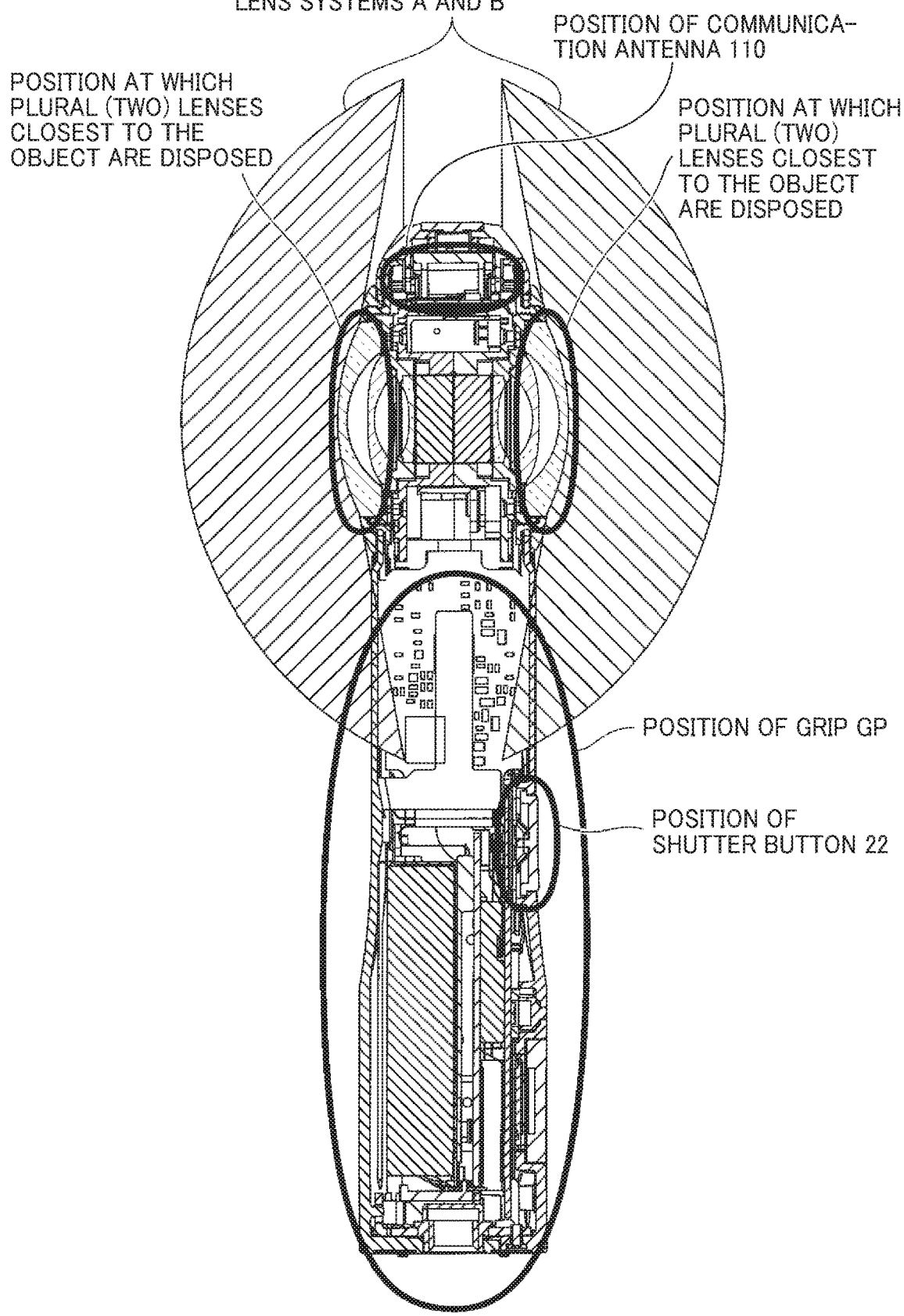
FIG. 14 is an illustration of a relative position between an optical path of light of a maximum angle of view and the communication antenna.

As described above, the imaging device 1 according to the embodiment of the present disclosure includes the casing 10, the two wide-angle lens systems A and B held by the casing 10, and the communication antenna 110 held by the casing 10. As illustrated in FIG. 14, the communication antenna 110 is disposed between the optical paths of light forming the maximum angle of view, so as not to be included in the optical paths of light forming the maximum angle of view. In other words, the communication antenna 110 is disposed at an area outside the optical paths of light of the maximum angle of view in the wide-angle lens systems A and B. With this configuration, the communication antenna 110 is reliably prevented from being reflected in a captured image (for example, a spherical image) (that is, a portion of the spherical image is absent due to the communication antenna 110) while the optical performance such as the resolution of the optical unit (in which the wide-angle lens systems A and B are combined with the image sensors AI and BI) and a wide angle of view are maintained. Accordingly, a high-quality image is obtained.

The casing 10 includes a relatively high-rigid metal casing (the rear metal casing 20 and the front metal casing 30) and a relatively low-rigid resin casing (the rear resin casing 70, the front resin casing 80, and the connection resin casing 90). The optical unit (formed by combining the wide-angle lens systems A and B and the image sensors AI and BI together) and the wireless module board 100 are held within the metal casing. Accordingly, the performance of the optical unit and the wireless module board 100 is maintained, and the external influence such as static load and impact is reduced (that is, durability is increased). With the communication antenna 110 held within the resin casing, the efficiency of wireless communication of, for example, a captured image is increased. In other words, the exterior component and built-in components around the communication antenna 110 are made of non-conductive resin materials. With this configuration, the communication antenna 110 is spaced away from any conductive components that block radio waves and electronic circuits that adversely affects the wireless communication.

The metal casing (the rear metal casing 20 and the front metal casing 30) has a grip GP at the lower portion of the imaging device 1, a shutter button 22 on the grip GP, and an opening OS at the upper portion of the imaging device 1. The resin casing (the rear resin casing 70, the front resin casing 80, and the connection resin casing 90) is disposed to cover (fill) the opening OS. If the communication antenna 110 is built in the grip GP made of the metal casing, radio waves are blocked by the photographer's hand when the photographer grips the grip GP to operate the shutter button 22, and the efficiency of wireless communication might decrease. However, with the configuration of the present embodiment in which the communication antenna 110 is embedded in the resin casing that covers the opening OS (filled with the resin casing) away from the shutter button 22 on the grip GP, the efficiency of wireless communication is maintained at a high level when the photographer grips the grip GP to operate the shutter button 22.

The present disclosure is not limited to the configuration of the present disclosure in which the communication antenna is disposed in the resin casing that covers the opening OS at the upper portion of the imaging device 1. However, the communication antenna may be disposed at any position to prevent the blocking of radio waves due to the photographer's hand gripping the grip GP to operate the shutter button 22, and a reduction in the efficiency of the wireless communication. As far as such prevention is achieved, the communication antenna may be disposed in the vicinity of the bottom-surface connection casing 60 at the lower portion of the imaging device 1. In this case, the shutter button 22 (on the grip GP) is disposed between the communication antenna at the lower portion and the lenses L1 (two lenses in this case) closest to the object within the front groups AF and BF of the wide-angle lens systems A and B.

The communication antenna 110, the front metal casing 30, and the connection resin casing 90 are combined as a single unit when a pair of fastening screws 120 is into the pair of screw through-holes 91 of the connection resin casing 90 and the pair of screw through-holes 113 of the antenna board 112 of the communication antenna 110, and screwed (tightened) into the pair of screw holes 33 of the front metal casing 30. Accordingly, the front metal casing 30, the connection resin casing 90, and the communication antenna 110 are combined as a single unit of a simple configuration, and assembly is facilitated.

The wide-angle lens system A(B) includes a front group AF (BF), a rear group AR (BR), optical-path changers (reflectors: a first prism AP1 (BP1) and a second prism AP2 (BP2)). The front groups AF and BF are opposed to each other in the front-to-back direction. The rear groups AR and BR extend in the up-to-down direction of the casing 10. The optical changer (reflector) is configured to change the optical path (reflect light) from the front-to-back direction of the front groups AF and BF to the up-to-down direction of the rear groups AR and BR. The communication antenna 110 is held by the casing 10 above the front groups AF and BF. Alternatively, when viewed in up-to-down direction, the communication antenna 110 is held by the casing 10 on the side opposite to the rear groups AR and BR across the front groups AF and BF.

In order to improve the quality of a captured image, the imaging device 1 according to the embodiments of the present disclosure includes upsized image sensors AI and BI, and three prisms (the first prism AP1 and BP1, the second prisms AP2 and BP2, and the third prisms AP3 and BP3). That is, the imaging device 1 has adopted the configuration that achieves the upsizing of image sensors and a three-times reflection using prisms. Further, more lenses are included in the front groups AF and BF and the rear groups AR and BR. This configuration adversely increases the optical unit. To avoid such a situation, the wireless module board 100 at the lower portion of the optical unit is made as a two-story structure of the sub-board 101 and the main board 102 facing in the front-to-back direction. Accordingly, the components are disposed within the casing 10 compactly.

Nevertheless, how and where to dispose the communication antenna 110 is a challenge that the present inventor faces. The present inventor has conceived of the configuration in which the communication antenna 110 is disposed at a position upper than the positions of the front groups AF and BF, and the configuration in which the communication antenna 110 is disposed at the opposite side to the rear groups AR and BR with respect to the front groups AF and BF when viewed along the up-to-down direction. In particular, the communication antenna 110 is disposed above the plurality of lenses L1 (two lenses in this case) closest to the object within the front groups AF and BF of the wide-angle lens systems A and B, respectively.

Further, the plurality of lenses L1 (two lenses in this case) disposed closest to the object are disposed between the communication antenna 110 and the shutter button 22 on the grip GP. This configuration reliably prevents the communication antenna 110 from being reflected in a captured image (for example, a spherical image) (that is, a portion of the spherical image is absent due to the communication antenna 110) while allowing the components to be compactly disposed within the casing 10. Accordingly, a high-quality image is obtained. Moreover, the efficiency of wireless communication is maintained at a high level when the photographer grips the grip GP to operate the shutter button 22.

The cases in which the imaging device 1 includes two wide-angle lens systems A and B are described in the above embodiments. However, no limitation is intended thereby, and the imaging device 1 may include three or more wide-angle lens systems. In this case, the number of image sensors mounted in the imaging device 1 may be equal to the number of wide-angle lens systems.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

The invention claimed is:

1. An imaging device comprising:
   a casing;

two wide-angle systems held by the casing and for capturing a spherical image; and
a communication antenna held by the casing,
wherein:
the communication antenna is disposed in an area outside an optical path of light of a maximum angle of view of each of the two wide-angle systems,
the casing includes a metal casing and a resin casing, the metal casing having a rigidity greater than a rigidity of the resin casing, and
the two wide-angle systems are held by the metal casing and the communication antenna is held by the resin casing.

2. The imaging device according to claim 1,
wherein the metal casing has a grip at a lower portion and an opening at an upper portion, and
the resin casing is disposed to cover the opening of the metal casing.

3. The imaging device according to claim 1,
wherein each of the communication antenna and the resin casing has a screw through-hole, and the metal casing has a screw hole,
the communication antenna and the metal casing constituting a single unit when a screw is into the through-hole and screwed into the screw hole.

4. The imaging device according to claim 1, further comprising:
a plurality of image sensors to form an image captured by the two wide-angle systems; and
a transmitter configured to transmit a signal of the image formed by the plurality of image sensors, to the communication antenna.

5. The imaging device according to claim 4,
wherein the transmitter includes at least one of a coaxial cable and a flexible printed circuit (FPC).

6. The imaging device according to claim 1,
wherein the two wide-angle systems include:
front groups disposed at an upper portion of the casing, the front groups opposed to each other along a front-to-back direction of the casing;
rear groups extending in an up-to-down direction of the casing; and
at least one reflector configured to reflect light from the front-to-back direction to the up-to-down direction,
the communication antenna is disposed above the front groups in the casing.

7. The imaging device according to claim 1,
wherein the two wide-angle systems include:
front groups disposed at an upper portion of the casing, the front groups opposed to each other along a front-to-back direction of the casing;
rear groups extending in an up-to-down direction of the casing; and
reflectors configured to reflect light from the front-to-back direction to the up-to-down direction,
the communication antenna is disposed at an opposite side to the rear groups with respect to the front groups in the casing when viewed along the up-to-down direction.

8. The imaging device according to claim 1,
wherein the communication antenna includes at least one of an FPC and a rigid FPC.

9. An imaging device comprising:
a casing;
two wide-angle systems held by the casing, each of the two wide angle systems including a lens closest to an object, the two wide-angle systems for capturing a spherical image;
a communication antenna held by the casing; and
a shutter button disposed on a surface of the casing,
wherein:
the lens closest to the object is disposed between the communication antenna and the shutter button,
the casing includes a metal casing and a resin casing, the metal casing having a rigidity greater than a rigidity of the resin casing, and
the two wide-angle systems are held by the metal casing and the communication antenna is held by the resin casing.

10. An imaging device, comprising:
a casing;
two wide-angle means for capturing images held by the casing and for capturing a spherical image; and
a communication antenna held by the casing,
wherein:
the communication antenna is disposed in an area outside an optical path of light of a maximum angle of view of each of the two wide-angle means for capturing images,
the casing includes a metal casing and a resin casing, the metal casing having a rigidity greater than a rigidity of the resin casing, and
the two wide-angle means for capturing images are held by the metal casing and the communication antenna is held by the resin casing.

11. The imaging device according to claim 10,
wherein the metal casing has a grip at a lower portion and an opening at an upper portion, and
the resin casing is disposed to cover the opening of the metal casing.

12. The imaging device according to claim 10,
wherein each of the communication antenna and the resin casing has a screw through-hole, and the metal casing has a screw hole,
the communication antenna and the metal casing constituting a single unit when a screw is into the through-hole and screwed into the screw hole.

13. The imaging device according to claim 10, further comprising:
a plurality of image sensors to form an image captured by the two wide-angle means for capturing images; and
a transmitter configured to transmit a signal of the image formed by the plurality of image sensors, to the communication antenna.

14. The imaging device according to claim 13,
wherein the transmitter includes at least one of a coaxial cable and a flexible printed circuit (FPC).

15. The imaging device according to claim 10,
wherein the two wide-angle means for capturing images include:
front groups disposed at an upper portion of the casing, the front groups opposed to each other along a front-to-back direction of the casing;
rear groups extending in an up-to-down direction of the casing; and
at least one reflector configured to reflect light from the front-to-back direction to the up-to-down direction,
the communication antenna is disposed above the front groups in the casing.

16. The imaging device according to claim 10,
wherein the two wide-angle means for capturing images include:
front groups disposed at an upper portion of the casing, the front groups opposed to each other along a front-to-back direction of the casing;

rear groups extending in an up-to-down direction of the casing; and reflectors configured to reflect light from the front-to-back direction to the up-to-down direction, the communication antenna is disposed at an opposite side to the rear groups with respect to the front groups in the casing when viewed along the up-to-down direction.

17. The imaging device according to claim 10, wherein the communication antenna includes at least one of an FPC and a rigid FPC.

* * * * *